UNITED STATES PATENT OFFICE.

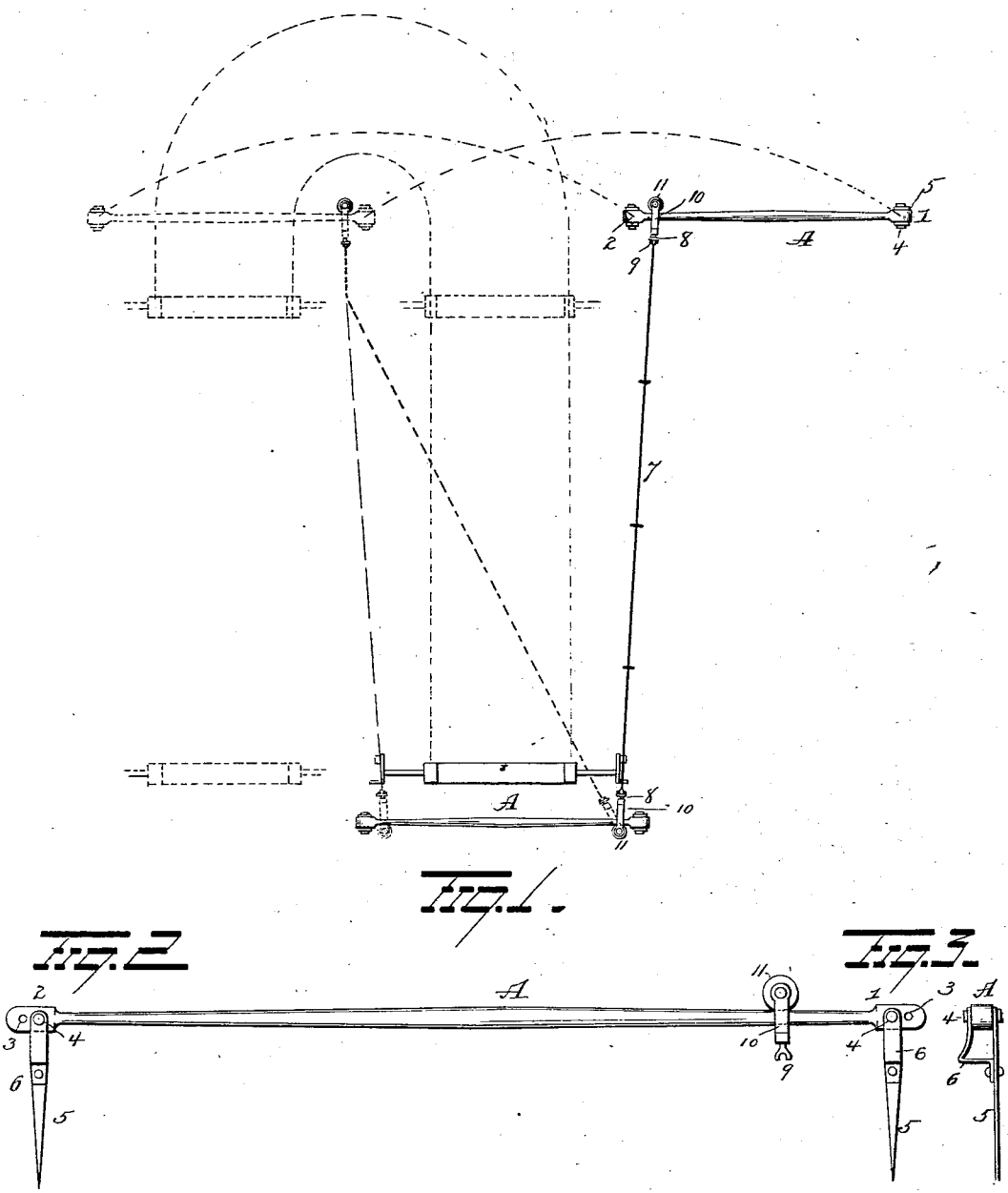

ALEXANDER McDONALD, OF ASHLEY, OHIO.

FIELD-ANCHOR FOR CHECK-ROW CORN-PLANTERS.

SPECIFICATION forming part of Letters Patent No. 564,710, dated July 28, 1896.

Application filed January 4, 1896. Serial No. 574,369. (No model.)

*To all whom it may concern:*

Be it known that I, ALEXANDER MCDONALD, a resident of Ashley, in the county of Delaware and State of Ohio, have invented certain new and useful Improvements in Field-Anchors for Check-Row Corn-Planters; and I do hereby declare the following to be a full, clear, and exact description of the invention, such as will enable others skilled in the art to which it appertains to make and use the same.

My invention relates to an improvement in field-anchors for check-row corn-planters, the object of the invention being to produce a field-anchor which shall be simple and substantial in construction, one which can be readily and quickly operated, and one which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a plan of a field, showing the application of my improvements. Figs. 2 and 3 are detail views.

A represents a bar or shaft having a body portion preferably round in cross-section and having angular ends or heads 1 2, each provided with holes 3 for the accommodation of bolts or pins 4, which pivotally connect the bar or shaft to stakes 5. In the drawings the ends of the bar or shaft are shown connected with the stakes at the inner holes 3, but should it be desired to plant in wider rows the stakes can be placed farther apart, so that the pins 4 can be passed through other holes 3 in the ends of said bar or shaft. Each stake 5 is preferably made of steel and is provided at its upper end with a bracket or brace 6, between which and the upper end of the stake the bar or shaft A is pivoted. The bracket or brace 6 forms a shoulder which, when the device is in operation, bears on the ground and materially assists the stake in withstanding the pressure on the bar or pole A, which pressure is exerted by the tension on the knotted wire 7. The knotted wire or cord 7 is provided at its ends with buttons 8, adapted to engage a hook 9, swiveled to a pulley-bracket 10, the pulley 11 in said bracket being adapted to run on the bar A.

In using my improvements one of the bars is located at one end of the field or plot of ground and another at the other end, one end of one bar being nearly in alinement with the opposite end of the other bar; that is to say, the outer end of one bar is nearly in alinement with the inner end of the other bar. The knotted wire extends from the outer end of one bar to the inner end of the other, a pulley being of course provided at each end of the wire to run on the respective bars. A check-row planter will then be connected with the wire at one end thereof and run to the other end, and the bar at the latter point will then be shifted in a manner presently explained. The stake at the inner end of the pole or bar will be withdrawn and the bar swung over on its pivotal connection with the other stake. After the bar shall have been thus swung over, the stake at the free end of the pole will be again anchored. The stake which formed the fulcrum above mentioned will then be withdrawn, and the bar will be again swung over on the newly-placed stake as its fulcrum, and the stake at the free end of the bar will be again anchored. After the bar has been swung over the first time and before swinging it over again so as to cover the space of four rows, the pulley will be shifted to the center of the bar, and then, as the bar is being turned the second time, as before explained, said bar will be pulled at an angle, so that when the stake reaches the ground the pulley will have reached the other end of the bar. By shifting the pulley to the center of the bar before swinging the latter the second time, the said bar will be relieved of undue strain on account of the tension of the wire thereon and the latter will not be unduly strained. The operator thus has perfect control of the devices to accurately adjust them, so that the rows of corn will be properly spaced apart, without the necessity of taking up the wire at the ends of the rows, stretching the wire, and anchoring it at random.

When the devices shall have been reset as above explained, the corn-planter will be turned, as indicated in dotted lines in the drawings, and attached to the wire, which latter will then mark a diagonal line, but as the corn-planter progresses in a straight line the wire will gradually become parallel with the rows, the pulley on the bar A at the opposite end of the field running from one end of said bar to the other, so that when the planter reaches said bar the wire will be again straight and parallel with the rows. The last-mentioned bar or pole will then be shifted in the manner above explained, and two more rows will be planted before it is again necessary to shift a bar or pole.

By my improvements the wire can be quickly shifted from one position to another with great accuracy, and the time necessary to plant corn in a plot of ground of given dimensions reduced to a minimum.

My improvements are simple and substantial in construction and are effectual in all respects in the performance of their functions.

Having fully described my invention, what I claim as new, and desire to secure by Letters Patent, is—

1. In a field-anchor, the combination with two stakes, of a bar or shaft having a pivotal connection with said stakes, whereby when one stake is withdrawn, the bar can be turned over on the other stake as a fulcrum, a trolley on said bar or shaft and a wire connected with said trolley, substantially as set forth.

2. In a field-anchor for corn-planters, the combination with stakes having shoulders thereon adapted to bear on the ground, of a bar or shaft connected to said stakes and a wire attached to said bar or shaft, substantially as set forth.

3. In a field-anchor for corn-planters, the combination with stakes, of a bracket on each stake forming a shoulder to bear on the ground, a bar or shaft connected to said bracket and stake and a wire movably connected with the bar or shaft, substantially as set forth.

4. In a field-anchor for corn-planters, the combination with stakes having brackets thereon, of a shaft or bar having its body portion made round in cross-section, angular heads on said shaft or bar disposed in said brackets and pivotally connected thereto, a trolley on said shaft or bar, a swiveled hook carried by the trolley and a wire connected with said swiveled hook, substantially as set forth.

In testimony whereof I have signed this specification in the presence of two subscribing witnesses.

ALEXANDER McDONALD.

Witnesses:
JOHN McDONALD,
A. C. LINN.